(12) United States Patent
Jogdand et al.

(10) Patent No.: US 11,040,412 B2
(45) Date of Patent: Jun. 22, 2021

(54) CONTROLLING AND DELIVERING GASES IN A PLASMA ARC TORCH AND RELATED SYSTEMS AND METHODS

(71) Applicant: Hypertherm, Inc., Hanover, NH (US)

(72) Inventors: Harshawardhan Jogdand, Lebanon, NH (US); Larry Benson, West Lebanon, NH (US); Liming Chen, Hanover, NH (US); John Peters, Canaan, NH (US); Ross A. Smith, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 181 days.

(21) Appl. No.: 16/351,349

(22) Filed: Mar. 12, 2019

(65) Prior Publication Data

US 2019/0210143 A1 Jul. 11, 2019

Related U.S. Application Data

(60) Division of application No. 15/474,683, filed on Mar. 30, 2017, now Pat. No. 10,279,417, which is a (Continued)

(51) Int. Cl.
*B23K 10/00* (2006.01)
*H05H 1/34* (2006.01)
*H05H 1/36* (2006.01)

(52) U.S. Cl.
CPC ............. *B23K 10/006* (2013.01); *H05H 1/34* (2013.01); *H05H 1/3405* (2013.01); *H05H 1/36* (2013.01);
(Continued)

(58) Field of Classification Search
CPC .... B23K 10/006; B23K 10/00; H05H 1/3405; H05H 1/36; H05H 1/341; H05H 2001/3473; H05H 2001/3493
(Continued)

(56) References Cited

U.S. PATENT DOCUMENTS 4,017,707 A 4/1977 Brown et al.
4,163,891 A 8/1979 Komatsu et al.
(Continued)

FOREIGN PATENT DOCUMENTS

WO WO 1999/004924 2/1999
WO WO 2008/033901 3/2008
WO WO 2012/009634 1/2012

OTHER PUBLICATIONS

"Controlling Plasma Arc Torches and Related Systems and Methods", Specification, Drawings, and Prosecution History of U.S. Appl. No. 15/287,696, filed Oct. 6, 2016, by Liebold et al.
(Continued)

*Primary Examiner* — Mark H Paschall
(74) *Attorney, Agent, or Firm* — Proskauer Rose LLP

(57) ABSTRACT

In some aspects, torch receptacles for coupling a plasma arc torch to a torch lead can include: a body having a first end to connect to the torch lead and a second end to connect to a torch body; a set of ports within the first end to fluidly connect to a set of fluid conduits within the torch lead; and a multiway valve within the body and fluidly connected to the set of ports and to a torch gas conduit formed in the second end, the multiway valve being configured to: i) manipulate a flow of fluids between the first end and the second end to select from primary gases entering the set of ports, ii) deliver a selected primary gas to the torch body through the torch gas conduit, and iii) fluidly connect the torch gas conduit to a gas supply manifold of the plasma cutting system.

11 Claims, 3 Drawing Sheets

Related U.S. Application Data continuation-in-part of application No. 15/287,694, filed on Oct. 6, 2016, now Pat. No. 10,562,125.

(60) Provisional application No. 62/237,780, filed on Oct. 6, 2015, provisional application No. 62/315,331, filed on Mar. 30, 2016.

(52) U.S. Cl.
CPC ............... *H05H 2001/3473* (2013.01); *H05H 2001/3494* (2013.01)

(58) Field of Classification Search
USPC ............ 219/121.44, 121.39, 121.54, 121.55, 219/121.57, 75
See application file for complete search history.

(56) References Cited

U.S. PATENT DOCUMENTS

| | | | |
|---|---|---|---|
| 4,861,962 A | 8/1989 | Sanders et al. | |
| 5,036,176 A | 7/1991 | Yamaguchi et al. | |
| 5,070,227 A | 12/1991 | Luo et al. | |
| 5,166,494 A | 11/1992 | Luo et al. | |
| 5,170,030 A | 12/1992 | Solley et al. | |
| 5,189,277 A | 2/1993 | Boisvert et al. | |
| 5,317,126 A | 5/1994 | Couch, Jr. et al. | |
| 5,380,976 A | 1/1995 | Couch, Jr. et al. | |
| 5,416,297 A | 5/1995 | Luo et al. | |
| 5,591,357 A | 1/1997 | Couch, Jr. et al. | |
| 5,614,110 A | 3/1997 | Shintani et al. | |
| 5,620,617 A | 4/1997 | Borowy et al. | |
| 5,695,662 A | 12/1997 | Couch, Jr. et al. | |
| 5,801,355 A | 9/1998 | Saio et al. | |
| 6,051,804 A | 4/2000 | Reynolds et al. | |
| 6,248,972 B1 * | 6/2001 | Yamaguchi | B23K 10/00 219/121.39 |
| 6,326,583 B1 | 12/2001 | Hardwick et al. | |
| 6,350,960 B1 | 2/2002 | Norris | |
| 6,365,868 B1 | 4/2002 | Borowy et al. | |
| 6,369,350 B1 | 4/2002 | Norris | |
| 6,498,317 B2 | 12/2002 | Hardwick | |
| 6,622,058 B1 | 9/2003 | Picard et al. | |
| 6,677,551 B2 | 1/2004 | Hardwick | |
| 7,115,833 B2 * | 10/2006 | Higgins | B23K 9/16 219/121.5 |
| 8,541,710 B2 * | 9/2013 | Brandt | H05H 1/34 219/121.39 |
| 8,809,728 B2 | 8/2014 | Brandt et al. | |
| 9,000,322 B2 * | 4/2015 | Barnett | H05H 1/341 219/74 |
| 9,321,120 B2 | 4/2016 | Wood et al. | |
| 9,951,942 B2 * | 4/2018 | Foret | H05H 1/34 |
| 2004/0045942 A1 | 3/2004 | Norris et al. | |
| 2005/0284849 A1 | 12/2005 | Eldridge | |
| 2006/0163216 A1 | 7/2006 | Brandt et al. | |
| 2008/0006614 A1 | 1/2008 | Brandt et al. | |
| 2008/0083714 A1 | 4/2008 | Kamath et al. | |
| 2008/0169272 A1 | 7/2008 | Brandt et al. | |
| 2008/0210670 A1 | 9/2008 | Brandt et al. | |
| 2010/0314362 A1 | 12/2010 | Albrecht | |
| 2012/0234803 A1 | 9/2012 | Liu et al. | |
| 2014/0374392 A1 * | 12/2014 | Hebert | B23K 10/00 219/121.51 |

OTHER PUBLICATIONS

"Controlling Plasma Arc Torches and Related Systems and Methods", Specification, Drawings, and Prosecution History of U.S. Appl. No. 15/287,698, filed Oct. 6, 2016, by Mitra et al.

\* cited by examiner

CONTROLLING AND DELIVERING GASES IN A PLASMA ARC TORCH AND RELATED SYSTEMS AND METHODS

RELATED APPLICATIONS

This application is a divisional application of U.S. patent application Ser. No. 15/474,683, filed Mar. 30, 2017, which is a continuation-in-part of U.S. patent application Ser. No. 15/287,694, filed Oct. 6, 2016 and entitled "Controlling Plasma Arc Torches and Related Systems and Methods," which claims the benefit of U.S. Provisional Patent Application Ser. No. 62/237,780, filed Oct. 6, 2015 and entitled "Controlling Plasma Arc Torches and Related Systems and Methods," the contents of all of which are hereby incorporated herein by reference in their entirety. U.S. patent application Ser. No. 15/474,683 also claims the benefit of U.S. Provisional Patent Application Ser. No. 62/315,331 filed Mar. 30, 2016, entitled "Gas Switching and Venting Proximate a Plasma Arc Torch," the contents of which are hereby incorporated herein by reference in their entirety.

TECHNICAL FIELD

This disclosure relates generally to plasma arc torch systems and more specifically to controlling and delivering gases to and within a plasma arc torch and related systems and methods.

BACKGROUND

Thermal processing torches, such as plasma arc torches, are widely used in the heating, cutting, gouging, and marking of materials. A plasma arc torch generally includes an electrode, a nozzle having a central exit orifice mounted within a torch body, electrical connections, passages for cooling, and passages for arc control fluids (e.g., plasma gas). A swirl ring can be used to control fluid flow patterns in the plasma chamber formed between the electrode and the nozzle. In some torches, a retaining cap can be used to maintain the nozzle and/or swirl ring in the torch body. In operation, a plasma arc torch produces a plasma arc, which is a constricted jet of an ionized gas with high temperature and sufficient momentum to assist with removal of molten metal. Power used to operate plasma arc torches can be controlled by a power supply assembly of a plasma operating system. The power supply and/or metering console, which is often located distant relative to the torch (e.g., several meters), can include a plurality of electronic components configured to control and supply an operational current to the plasma arc torch, the gas flows provided to the plasma arc torch, and, in some cases, motion of the plasma arc torch. This distance between the torch and the power supply/metering console can vary system to system and installation to installation.

In plasma arc cutting systems, transient state electrode life, cut quality and consistency, and overall operations can be affected by or is dependent upon ramp times (e.g., the rate at which plasma current and/or plasma gas rises and drops during start-up and shut down), which can be selected during process parameter development for a given system. These process parameters (i.e., waveforms) typically reside in the power supply (often many meters from the actual torch tip) and are independent of the system configuration being used. Some systems are configured to implement certain gas during transition, start up, or shut down profiles and gas characteristics based on the desired characteristics of the arc during use. For example, some systems can provide desirable gas flow or current profile combinations for shut down.

SUMMARY

In some aspects, torch receptacles for coupling a plasma arc torch to a torch lead of a plasma cutting system and for upstream venting the torch lead, and in some cases the plasma arc torch, through the plasma cutting system can include: a body having a first end shaped to connect to the torch lead and a second end shaped to connect to a torch body of the plasma arc torch; a set of ports disposed within the first end of the body and configured to fluidly connect to a set of fluid conduits disposed within the torch lead; and a multiway valve disposed within the body and fluidly connected to the set of ports and to a torch gas conduit formed in the second end of the body, the multiway valve being configured to: i) manipulate a flow of fluids between the first end and the second end of the body to select from primary gases entering the set of ports, ii) deliver a selected primary gas to the torch body through the torch gas conduit, and iii) fluidly connect the torch gas conduit to a gas supply manifold of the plasma cutting system to permit venting of the torch gas conduit through the gas supply manifold.

Embodiments can include one or more of the following features.

The body can be formed of a substantially insulative material. The body can have a length of less than about 1 foot between the first end and the second end. The body can define a set of fluid flow paths disposed substantially within the body to fluidly couple the multiway valve to the fluid conduits within the torch lead.

The multiway valve can be a 3-way valve fluidly coupled to a first conduit of the set of fluid conduits, a second conduit of the set of fluid conduits, and the torch gas conduit and is configured to select gas from either the first conduit or the second conduit and permit delivery of the selected gas to the torch body via the torch gas conduit. The multiway valve can be located less than 12 inches from a plasma plenum of the plasma arc torch. The multiway valve can be configured to switch a supply of gas provided to the torch body via the torch gas conduit between gases entering the set of ports.

The set of ports can include a first plasma gas port and a second plasma gas port, where the first plasma gas port is configured to receive a plasma pre-flow gas and the second plasma gas port is configured to receive a plasma cut flow gas. The set of ports can include a shield gas port fluidly connected to a shield gas conduit formed between the first end of the body and the second end of the body. The torch gas conduit can have a volume of less than about 0.3 cubic inches. In some cases, the torch gas conduit has a volume of less than about 0.2 cubic inches. The torch lead can fluidly couple at least one of the set of conduits to vented atmospheric pressure. In some examples, an excess of plasma gas blocked from entering the torch gas conduit by the multiway valve is vented upstream through the torch lead.

In some aspects, plasma arc torch systems for backventing plasma gas upstream through a plasma torch lead line can include: a plasma torch power supply having: a set of gas supplies comprising a first plasma gas and a second plasma gas, a torch lead manifold to fluidly connect the set of gas supplies to the plasma torch lead line, and a vent valve to vent the first plasma gas to atmospheric pressure; a plasma torch lead line configured to couple to the torch lead manifold, the plasma torch lead line defining a set of fluid passages to convey the first plasma gas and the second plasma gas from the plasma torch power supply; and a torch receptacle for coupling a plasma arc torch to the plasma torch power supply, the torch receptacle having a body having a first end to couple to the plasma torch lead line and a second end shaped to connect to a torch body of the plasma arc torch, a set of ports defined within the first end of the body and configured to fluidly connect to the set of fluid passages of the plasma torch lead line, and a 3-way multiway valve disposed within the body and fluidly connected to the set of ports, to be fluidly coupled to a first passage of the set of fluid passages in the plasma torch lead line and to a second passage of the set of fluid passages in the plasma torch lead line, and to a torch gas conduit formed in the second end of the body having a volume of less than about 0.3 cubic inches, the 3-way multiway valve being configured to: i) manipulate a flow of fluids between the first end and the second end of the body to select from primary gases entering the set of ports, ii) deliver a selected primary gas from either the first passage or the second passage to the torch body through the torch gas conduit, and iii) fluidly connect the torch gas conduit to a torch lead manifold of the plasma torch power supply to permit venting of the torch gas conduit through the torch lead manifold to atmospheric pressure.

In some aspects, methods of operating a plasma cutting system by selecting between a set of plasma gases in a torch receptacle coupling a plasma arc torch to a torch lead of the plasma cutting system, the torch receptacle having a valve configured to manipulate a flow of fluids to the plasma arc torch between the gases of the set of plasma gases, can include: supplying a pre-flow plasma gas through a first conduit of the torch lead coupled to the torch receptacle, the pre-flow plasma gas traveling to the plasma arc torch through the valve; igniting a plasma arc within the plasma arc torch in the presence of the pre-flow plasma gas; selecting a cut plasma gas by activating the valve to: i) limit further flow of the pre-flow plasma gas downstream to the plasma arc torch, and ii) permit flow of the cut plasma gas from a second conduit of the torch lead to the plasma arc torch through the valve; venting the first conduit of the torch lead to atmospheric pressure at a manifold upstream of the plasma arc torch to release the pre-flow plasma gas from the torch lead; and performing a plasma cutting operation using the cut plasma gas.

Embodiments can include one or more of the following features.

The methods can further include activating the valve to: i) limit further flow of the cut plasma gas downstream to the plasma arc torch from the second conduit, and ii) vent remaining cut plasma gas upstream through the torch lead and out the manifold within the plasma cutting system power supply to reduce pressure in the plasma arc torch. The methods can also further include initiating a plasma arc shut down sequence.

The venting the first conduit of the torch lead can include opening a valve within a plasma cutting system power supply to which the torch lead is attached. The selecting the cut plasma gas can transition a gas supply at the plasma arc torch from the pre-flow plasma gas of the first conduit to the cut plasma gas of the second conduit in less than about 1 second.

In some examples, a distance between the valve in the torch receptacle can be at least about 2 meters from the manifold within the plasma cutting system power supply.

Embodiments described herein can have one or more of the following advantages.

The systems and components described herein can be used to carry out any of various methods for controlling and delivering gases within a plasma cutting system. For example, the precise and dynamic control by the systems described herein can be used to control, modify, tailor, manipulate, and optimize gas flows and/or selections within the plasma cutting system. In some embodiments, this can correspond to or match gas profiles, pressures, and selections for given processes to improve the cut quality or to prolong electrode life by reducing plasma torch ramp-down errors. A ramp-down error (RDE) can occur when the plasma system experiences a sudden loss of the plasma arc, for example, when the plasma torch runs off of the workpiece and is unable to complete the coordinated ramp-down of plasma gas plenum pressure and cutting current (which in some cases is referred to as "Long Life Technology"). The sudden loss of the arc without a proper arc extinguishing sequence can result in high pressure gases blowing over molten emitter material and thus excessive wear. That is, the sudden loss of arc can cause increased hafnium wear, especially in the presence of oxygen. For example, in some cases, without a proper arc extinguishing sequence, when the plasma arc is immediately lost, the high pressure of the plasma gas continuing to flow as if the plasma arc is still connected to the workpiece can blow away molten emitter material, which can lead to the wear. Thus, precise and accurate plasma gas ramping techniques can be especially useful for prolonging electrode life when the steady state cutting process is transitioned to torch shutdown (i.e., extinguishing the arc). That is, the power supply can, upon predicting/detecting an undesired arc loss is about to occur, which could cause unnecessary wear to the electrode if the gas delivery is not adjusted to account for upcoming arc loss, take action to limit such unnecessary wear to prolong life of the electrode by quick and responsive adjusting of plasma gas provided to the torch.

For example, the systems and methods described herein can be implemented and used in association with other torch control systems that can monitor these electrical, system, and control parameters to predict when a plasma arc is about to be lost, for example, when the plasma torch travels beyond the edge of a material being processed. In response, the power supply can quickly take action to prevent sudden loss of the arc, which could result in electrode wear and a shorter lifetime. As discussed below, this quick action to prevent sudden loss of the arc can include adjusting electrical parameters of the arc, gas flows to the torch, or motion of the torch itself. Additional details regarding ramp down error detection and prevention can be found in Applicant's related co-pending U.S. patent application Ser. No. 15/287,694, filed on Oct. 6, 2016 and titled "Controlling Plasma Arc Torches and Related Systems and Methods," the contents of which are hereby incorporated by reference in their entirety. Such controlled gas delivery methods during shut down sequences have been shown to improve consumable life, such as usable electrode life. For example, electrode life can be hindered (e.g., limited) by long plasma pressure ramp down times and the transition from pre-flow gas to cut flow gas.

Whereas, the systems and methods described herein can be used to improve electrode life and torch performance by providing faster gas switching transition times. For example, conventional systems in which gas is switched at the power supply can cause long gas transitions, resulting in some blend of pre-flow and cut flow gases in the lead line delivered to the torch. This can cause an issue in that the chemistry of some gases is better suited for pre-flow, the chemistry of some other gases is better suited for cutting, and the chemistry of some other gases can be better suited for ramp down (e.g., during torch shut down). Thus, the ability to quickly switch between these different gases in a controlled and precise manner can improve cut quality, consumable life, system responsiveness, and provide other benefits. Whereas, using the systems described herein, gas transition from pre-flow to cut flow can occur at or near the torch, which results in faster transition times and thus longer electrode life. For example, some conventional systems may require ramp down times of at least 250 microseconds, but some of the systems described herein can have ramp down times that are less than about 50 microseconds.

Additionally, quickly changing gas delivered to the torch at a position near the torch, such as at the torch receptacle, can help to make torch performance and operations be more consistent among different torches configurations (e.g., torches of different lengths (e.g., different torch lead line lengths)). For example, some conventional systems have only one plasma gas line connected to the torch that is used to provide both pre-flow and cut flow gases. Thus, the gas switching from pre flow to cut flow happens far away from the torch and the actual transition of gases within the torch is typically dependent on (or otherwise affected by) gas lead lengths. Whereas, the systems and methods described herein, in which gas switch can occur closer to the torch, can provide for torch control and gas switching response times that are substantially independent of lead length. For example, to expel a desired gas (e.g., to expel a pre-flow gas in order to use cut flow gas or to expel cut flow gas to extinguish a torch), conventional torch systems typically activate a valve (or have a vent valve) at or near the power supply (i.e., on an end of the lead line opposite the torch, in a gas metering console, etc.) to change gas delivered to the torch. Once the valve is activated, the residual gas (e.g., gas present in the lead line) is typically allowed to be expelled from this valve through the torch. However, this can cause undesired delays in the change of gas or an undesired mixing of gases. Thus, as a result of the systems and methods described herein in which the multiway valve is located close to the torch (e.g., less than about 12 inches), gas can be switched from a pre-flow gas to a cut flow gas much more quickly.

In addition to increasing the ability to switch gases for torch ramp down, the systems and methods described herein can utilize the fast gas switching techniques during torch start-up, for example, to transition from a pre-flow gas to a cut flow gas nearly instantaneously (e.g., in less than about 50 microseconds). As discussed in detail below, pre-flow gases are gases better suited for starting and prolonging electrode life, so they are desired to be used for ignition. Then, once the arc is transferred, gas switching can happen to provide a cut flow gas, which is better suited for cutting. In some conventional systems, this switch happens at arc transfer but there is a considerable delay in start of cut to account, in part, for the delay in gas switching (e.g., for the pre-flow gas to decay out of the lead line and be replaced by the cut flow gas). Whereas, using the systems and methods described herein that have faster and better controlled gas switching, cutting can begin more quickly and or instantly/immediately following arc transfer.

Additionally, this gas changing sequence in conventional systems at or near the power supply can cause inconsistent performance between torches having different lead line lengths. That is, conventional plasma cutting platforms offer different lead/hose lengths (e.g., between the metering console (e.g., at the power supply) and the torch) in order to cater to customer specific requirements. This length variation, which can vary between about 6 feet to about 50 feet (or more), can result in inconsistent gas transition times and profiles which compromise quality and consistency, and/or in gas ramp time variation making consumable life partly dependent on system configuration and can deprive customers of uniform consumable performance. This means that overall life of the electrode can be hindered by long plasma pressure ramp down times, which can drive/require these times via the distance between the control elements (e.g., gas control valves) and the torch. Furthermore, electrode life can also be effected by the transition from pre-flow gas to cut flow gas and the timing of this transition needs to be controlled. For example, in some conventional plasma systems, unwanted gases from within the lead are expelled from the torch itself, longer lead lengths will typically require a longer time to evacuate all of the residual gas than a shorter lead length will. Whereas, in some examples, instead of having to extinguish a plasma arc and then drain the gas in the lead line, the systems herein can be used to drain the gas supply line while the arc is still on. For example, the inconsistencies can be reduced by adding the gas switching valve (e.g., a three way valve) immediately upstream of the torch and connecting two plasma lines (pre-flow and cut-flow) to this valve. Thus, gas switching and predictable ramp downs can be achieved independent of lead length. Bringing two plasma lines close to the torch can help to provide fast (e.g., near instantaneous) switching of gases (pre-flow to cut-flow) and improved ramp down responsiveness.

DETAILED DESCRIPTION

In some aspects, as discussed herein, the systems and methods described herein can include a plasma cutting system having one or more precisely and dynamically monitored and controlled gas parameters, such as plasma gas flow or shield gas flow. The precise control of these systems has been found to be useful to implement several advantageous torch control methods described herein. Example methods, as discussed in detail herein, include quickly adjusting flow of different plasma gases provided to the torch during plasma arc start-up or ramp-down procedures. More responsive gas handling has been found to yield better and/or more consistent consumable performance and life.

Figure 1:
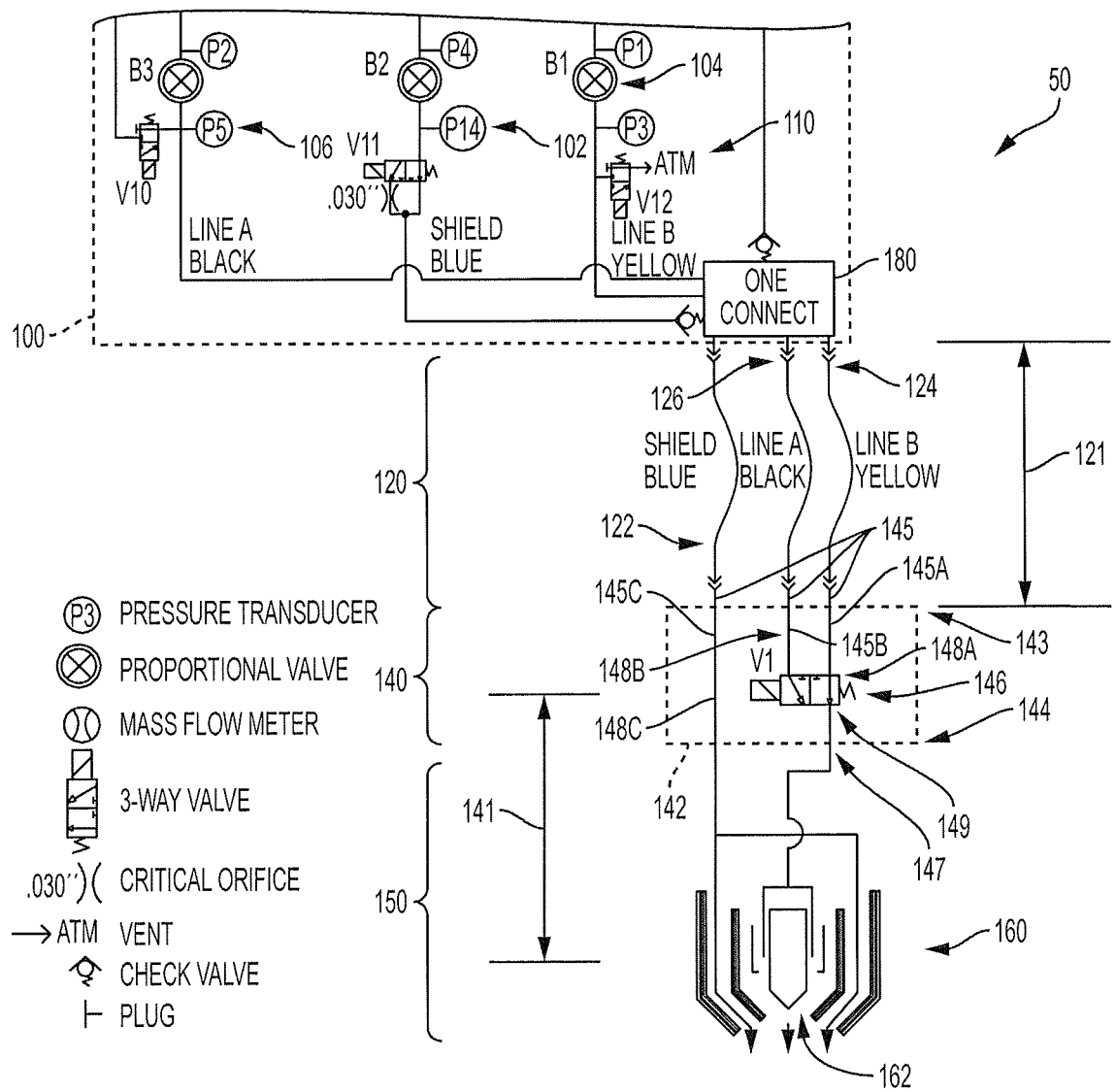
FIG. 1 is a schematic diagram of a plasma arc torch system having a system for back-venting in a plasma arc torch upstream through a plasma torch lead line.

Referring to FIG. 1, in some cases, a plasma cutting system (e.g., plasma arc torch system) 50 for back-venting plasma gas in a plasma arc torch upstream through a plasma torch lead line can include a plasma torch power supply 100, a plasma torch lead line 120, a torch receptacle 140, and a plasma arc torch 150 having a torch body 160. The torch receptacle 140 can serve as an interfacing component between the lead line 120 and the plasma arc torch 150.

The power supply 100 can include a metering console with a set of gas supplies, which can include a shield gas supply 102, a first processing gas (e.g., plasma gas (e.g., a pre-flow plasma gas)) supply 104, and a second processing gas (e.g., plasma gas (e.g., a cut flow plasma gas)) supply 106. The configurations of the different gas supplies can vary based on the desired material processing operation. For example, in some cases, the first plasma gas 104 can include nitrogen. In some cases, the second plasma gas 106 can be oxygen. The gas supplies can include various hardware components, such as valves (e.g., three-way valves or proportional valves) and pressure transducers, which can be used to control and monitor the flow of gas.

The power supply 100 also typically includes a torch lead manifold 108. The torch lead manifold 108 can be used to selectively fluidly connect the set of gas supplies to the torch body 160, for example, via the plasma torch lead line 120. The torch lead manifold 108 can include a pneumatic switch that can open and close different flow paths to permit or limit gases from flowing to and from torch lead line 120.

The power supply 100 can also include a vent (e.g., a vent valve) 110 to reduce the pressure of one or more of the gases. For example, the vent 110 can permit a gas to be opened to atmospheric pressure. In some cases, the vent valve 110 can be fluidly connected to the first processing gas supply 104 and be configured to vent the first processing gas (e.g., from the torch lead line, as discussed below) to the atmosphere. In some cases, as detailed below, this venting can be performed to quickly evacuate processing gas (e.g., upstream) from the lead line 120, while the torch 150 (e.g., plenum) may be exhausted downstream/forward through the torch tip.

The plasma torch lead line 120 is configured to connect the plasma torch 150 to the power supply 102. For example, the lead line 120 can be configured to connect to the power supply 102 to couple to a torch lead manifold 108 and the torch receptacle 140. Torch lead manifold 108 may be located external/separate to power supply 102 or within power supply 102. The plasma torch lead line 120 is typically configured to deliver fluids (e.g., torch gases) to the torch 150. For example, the lead line 120 can define a set of fluid passages (e.g., conduits) to convey the first plasma gas and the second plasma gas from the plasma torch power supply to the torch body 160. The lead line 120 can include a shield gas passage 122, a first processing gas passage 124, and a second processing gas passage 126. The shield gas passage 122 can convey the shield gas to the torch 150 (e.g., to the torch receptacle 140). The first processing gas passage 124 can convey the first processing gas to the torch 150 (e.g., to the torch receptacle 140). The second processing gas passage 126 can convey the second processing gas to the torch 150 (e.g., to the torch receptacle 140). The lead line can include any of various structurally suitable components to convey the gases. For example, the lead line 120 can include a multi-chamber hose, such as a hose having two or more (e.g., three to accommodate the shield gas, first processing gas, and second processing gas) separated flow paths. In some cases, the lead line 120 can include three distinct hoses coupled to one another.

The plasma torch lead line 120 can have any of various lengths depending on the desired operation and environment of use. For example, in some case, the plasma torch lead line 120 can have a length 121 that is at least about 2 meters, 5 meters, or 50 meters.

The torch receptacle 140 can be configured to couple a plasma arc torch body 160 to the plasma torch power supply 100, for example, by the lead line 120. The torch receptacle 140 can include a body 142 having a first end 143 to couple to the plasma torch lead line 120 and a second end 144 shaped to connect to a torch body 160 of the plasma arc torch 150. The receptacle 140 can include a set of ports 145 defined within the first end 143 of the body 142. The ports 145 can be configured to fluidly connect to the set of fluid passages 122, 124, 126 of the plasma torch lead line 120. The set of ports 145 typically comprises a first plasma gas port 145A and a second plasma gas port 145B. The first plasma gas port 145A can be configured to receive a plasma pre-flow gas (e.g., gas 104) and the second plasma gas port 145B can be configured to receive a plasma cut flow gas (e.g., gas 106). A third port 145C can be a shield gas port configured to receive a shield gas (e.g., gas 106).

The body 142 can define a set of fluid flow paths (e.g., gas channels) 148 disposed substantially within the body to fluidly couple to the fluid conduits 122, 124, 126 within the torch lead 120 via the gas ports 145A, 145B, 145C. For example, the body can define a first plasma gas channel 148A connected to the gas port 145A, a second plasma gas channel 148B connected to the gas port 145B, and a shield gas channel (e.g., shield gas conduit) 148C connected to the gas port 145C. As discussed below, the first plasma gas channel 148A and the second plasma gas channel 148B can fluidly connect gas ports 145A and 145B to a valve 146 to select between the two gases flowing therein. For example, the valve 146 can select between the two gases flowing in the first plasma gas channel 148A and the second plasma gas channel 148B, respectively, and determine which gas can flow on to the torch (e.g., via a torch gas conduit 149 discussed below). That is, the valve 146 can block one of the gases (e.g., either the gas in the first plasma gas channel 148A or the gas in the second gas channel 148B) from flowing on to the torch while permitting the other gas to flow on to the torch. The shield gas port 145C can be fluidly connected to a shield gas conduit 148C formed between the first end 143 and the second end 144.

The body 142 can be formed of any of various materials. In some embodiments, the body 142 is formed of a substantially insulative material. For example, the body can be made of Ryton/Thermec, Techtron, Torlon, Vespel, or other material.

The body 142 has a short length (e.g., shorter relative to other components such as the lead line 120). As discussed below, components within the receptacle (e.g., valves) can be used to quickly evacuate gases from the torch body 160 so that one or more material processing sequences, such as a torch shut down sequence (e.g., a ramp down error sequence), which may perform more optimally in the presence or absence of certain gases, can be initiated. For example, in some embodiments, the body can have a length that is less than about 1 foot (e.g., less than about 6 inches) between the first end 143 and the second end 144.

The receptacle 140 can also include a fluid selection valve (e.g., a 3-way multiway valve) 146 disposed within the body 142 and fluidly connected to the set of ports 145, to be fluidly coupled to the first passage 124 and to the second passage 126 in the plasma torch lead line 120. The valve 146 is configured to fluidly connect the first and/or second passage to a torch gas conduit 149 formed at or near the second end 144. The torch gas conduit 149 can deliver the gas selected by the valve 146 to the torch body 160. In some cases, the torch gas conduit 149 is fluidly connected to the torch tip, for example, without obstructions between the valve 146 and the plasma plenum. In some embodiments, the torch gas conduit 149 of the body has a volume of less than about 0.3 cubic inches (e.g., between the valve 146 and the torch tip (e.g., between the valve 146 and the outer surface of the downstream second end of the receptacle body)). In some embodiments, the torch gas conduit 149 has a volume of less than about 0.2 cubic inches. For example, in some cases, the torch gas conduit volume can be a defined or enclosed space between the valve 146 and an output port 147 of the receptacle (e.g., formed along an outer surface of second end of the body) that provides the selected processing gas to the torch. This small volume of the torch gas conduit 149 can help to provide fast gas transition times and reduce (e.g., minimize, eliminate) gas pressure decay and the associated negative effects of prolonged gas pressure decay, such as prolonged ramp down times. Additionally, the substantially fixed volume of the torch gas conduit 149 can provide consistent behavior in timing of gas transitions from pre-flow to cut flow gas during torch ignition and a consistent ratio between the gas pressure and current during extinction of the arc.

In some embodiments, the 3-way valve 146 is configured to select gas from either the first passage (e.g., conduit) 124 or the second passage (e.g., conduit) 126, for example, as it enters the ports 145A and/or 145B, and permit delivery of the selected gas to the torch body via the torch gas conduit 149. For example, the 3-way multiway valve 146 can be configured to change (e.g., selectively manipulate) a flow of fluids between the first end 143 and the second end 144 of the body to select from primary gases that have entered the set of ports 145 and are being conveyed to torch gas conduit 149. For example, the valve 146 can be used to fluidly connect to the first processing gas 104 and the second processing gas 106 to the torch gas conduit 149. The valve 146 can also selectively deliver a selected primary gas (e.g., from the first passage 124 or the second passage 126) to the torch through the torch gas conduit 149.

In addition to delivering gas to the torch, the valve 146 can fluidly connect the torch gas conduit 149 to a location upstream of the torch, such as the power supply (e.g., to the torch lead manifold 108). This fluid connection to a component upstream can be used to permit venting through the torch lead manifold 108 to atmospheric pressure. For example, the torch lead line 120 can fluidly couple at least one of the gas channels 148 to vented atmospheric pressure. For example, gas present in one or more of the fluid passages 122, 124, 126 of the lead line 120 can be expelled from the torch system through the torch lead manifold 108 and then out of the system (e.g., to atmosphere) through the vent valve 110 (e.g., rather than all being exhausted forward through torch tip). Additionally, in some embodiments, the valve 146 can be used to limit the flow of gas (e.g., one of the plasma gases (e.g., pre-flow or cut flow) from entering the torch gas conduit 149 and therefore also the torch body 160. In some cases, an excess of plasma gas blocked from entering the torch gas conduit 149 by the multiway valve 146 can be vented upstream through the torch lead 120.

The multiway valve 146 can include any of various types of suitable gas switching valves. The multiway valve 146 can be configured such that at least one of the processing gases (e.g., the pre-flow gas or the cut flow gas) is always fluidly connected to the torch gas conduit 149. For example, the multiway valve 146 can be quickly switched back and forth so that at least one of the gases always flows to the torch.

As mentioned above, the receptacle 140 can be positioned at or near the torch body 160 in order to quickly and efficiently alter or replace gas (e.g., plasma gas) within the torch. In some embodiments, the multiway valve 146 can be located at a length 141 that is less than about 12 inches (e.g., less than about 6 inches) from a plasma plenum 162 of the plasma arc torch body 160. In some embodiments, the valve 146 within the receptacle can be positioned away from the power supply 100. For example, the valve 146 in the torch receptacle 140 can be at least about 2 meters from the manifold 108 of the plasma cutting system power supply 100.

Figure 3:
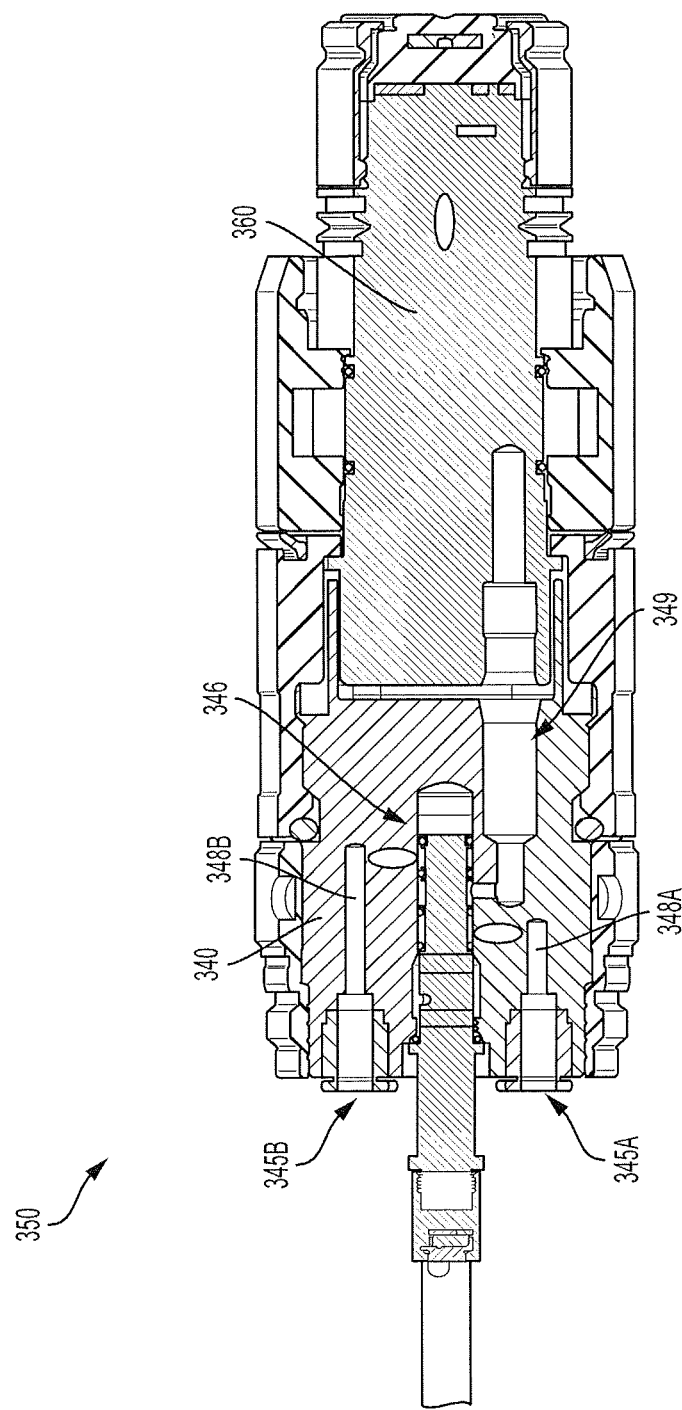
FIG. 3 is a side cutaway view of an example torch having a multiway valve disposed therein for selectively providing gas to a plenum area.

The plasma cutting systems depicted and described with respect to FIG. 1 can be implemented in various examples, such as mechanized torches or handheld portable torches. For example, referring to the cutaway view of FIG. 3, a mechanized torch 350 can include a valve 346 to direct one or more processing gases therein received from a power supply, such as the power supply 100 described above. The torch 350 can include a receptacle 340 configured to couple to a torch body 360. The receptacle can define ports 345A and 345B, connected to processing gas channels 348A and 348B, and permit delivery of the selected gas to the torch body 360 via a torch gas conduit 349. A multiway valve 346, as described above and below, can be disposed within the receptacle 340 to selectively permit gases entering the receptacle through the ports 345A, 345B and processing gas channels 348A, 348B to proceed and flow on to a plasma plenum of the torch.

In some aspects, the plasma cutting systems described above (e.g., plasma arc torch system 50) can be used to select between a set of plasma gases (e.g., a pre-flow gas and a cut flow gas) in a torch receptacle (e.g., the receptacle 140) that couples a plasma arc torch (e.g., the torch 150) to a torch lead (e.g., the torch lead line 120), where the torch receptacle 140 includes a valve (e.g., multiway valve 146) configured to manipulate a flow of fluids to the plasma arc torch between the gases of the set of plasma gases (e.g., by selecting between the pre-flow gas and the cut flow gas).

In some embodiments, an example method can include supplying a pre-flow plasma gas (e.g., from gas 104) through a first conduit (e.g., the first processing gas passage 124) of the torch lead coupled to the torch receptacle, the pre-flow plasma gas traveling to the plasma arc torch through the valve (e.g., valve 146). This can allow pre-flow gas, such as nitrogen to flow to the torch (e.g., to the plasma plenum of the torch).

In some cases, the method can include igniting a plasma arc within the plasma arc torch in the presence of the pre-flow plasma gas. The torch system can detect or sense that ignition has occurred and a plasma arc has been formed between the electrode and the nozzle of the torch.

With the plasma arc ignited, the method can include selecting a cut plasma gas (e.g., from gas 106). For example, the cut plasma gas can be selected by activating the valve to limit further flow of the pre-flow plasma gas downstream to the plasma arc torch. Activating the valve can also permit flow of the cut plasma gas from a second conduit (e.g., the second processing gas passage 126) of the torch lead to the plasma arc torch through the valve. Switching from the pre-flow gas to the cut flow gas can happen quickly. Since the receptacle 140 is located close to the torch, the change in gas provided to the torch can be accomplished quickly, for example, typically faster than if the change in gas flow was directed at the power supply (e.g., only at the manifold 108). This is typically because if the gas is switched at or near the torch, the contents of the lead line need not be exhausted from the lead line and through the torch before the gas change can be completed. As discussed herein, such fast responsiveness in gas flow can be useful in enacting changes to a material processing operation, such as an accelerated shut down procedure. Some testing has shown that gas ramp down time can be reduced using the systems and methods described herein by about 35 milliseconds to about 100 milliseconds. For example, the selecting the cut plasma gas can transition a gas supply (e.g., from the torch gas conduit 149) at the plasma arc torch from the pre-flow plasma gas of the first conduit to the cut plasma gas of the second conduit in less than about 1 second.

In some embodiments, the method can include venting the first conduit of the torch lead to a pressure lower than that of the plasma plenum, such as atmospheric pressure, at a position upstream of the plasma arc torch, which can release the pre-flow plasma gas from the torch lead. In some cases, venting the first conduit of the torch lead can include opening a valve within a plasma cutting system power supply to which the torch lead is attached. For example, the manifold 108 within the power supply can be opened to vent the first processing gas passage 124 to atmospheric pressure. In some cases, this can be performed after the valve blocks flow of the pre-flow gas and permits the cut flow gas to flow to the torch.

The method can also include performing a plasma cutting operation using the cut plasma gas. For example, once the plasma gas has been switched, for example using the valve 146, from the pre-flow to cut flow, the torch can carry out a cutting operation using the cut flow gas as plasma gas.

In some embodiments, the methods can also include activating the valve (e.g., valve 146) in order to limit further flow of the cut plasma gas (e.g., gas 106) from passing downstream to the plasma arc torch from the second conduit (e.g., the second processing gas passage 126). Activating the valve (e.g., valve 146) can also vent the remaining cut plasma gas upstream through the torch lead and out the manifold (e.g., manifold 108) within the plasma cutting system power supply to reduce pressure in the plasma arc torch. That is, the valve can be switched to block cut gas from further traveling to the torch while the manifold 108 can be opened so that any cut gas present in the lead line can be expelled from the system. In some embodiments, this can be performed in conjunction with a plasma arc shut down sequence. In some cases, the method can include activating the valve just prior to, or simultaneously with, initiating a plasma arc shut down sequence.

Other configurations are possible. Unless otherwise stated, the other example embodiments can include one or more features or components from the examples described above. For example, in some embodiments, the valve 146 can be connected directly to a vent. For example, gases may be changed or controlled at the power supply and provided to the receptacle 140, such as via the port 145A and the port 145B can be vented, for example, to atmospheric pressure. One or more of the gas delivery methods described herein can be carried out using such a configuration by venting at the receptacle rather than at the power supply.

Figure 2:
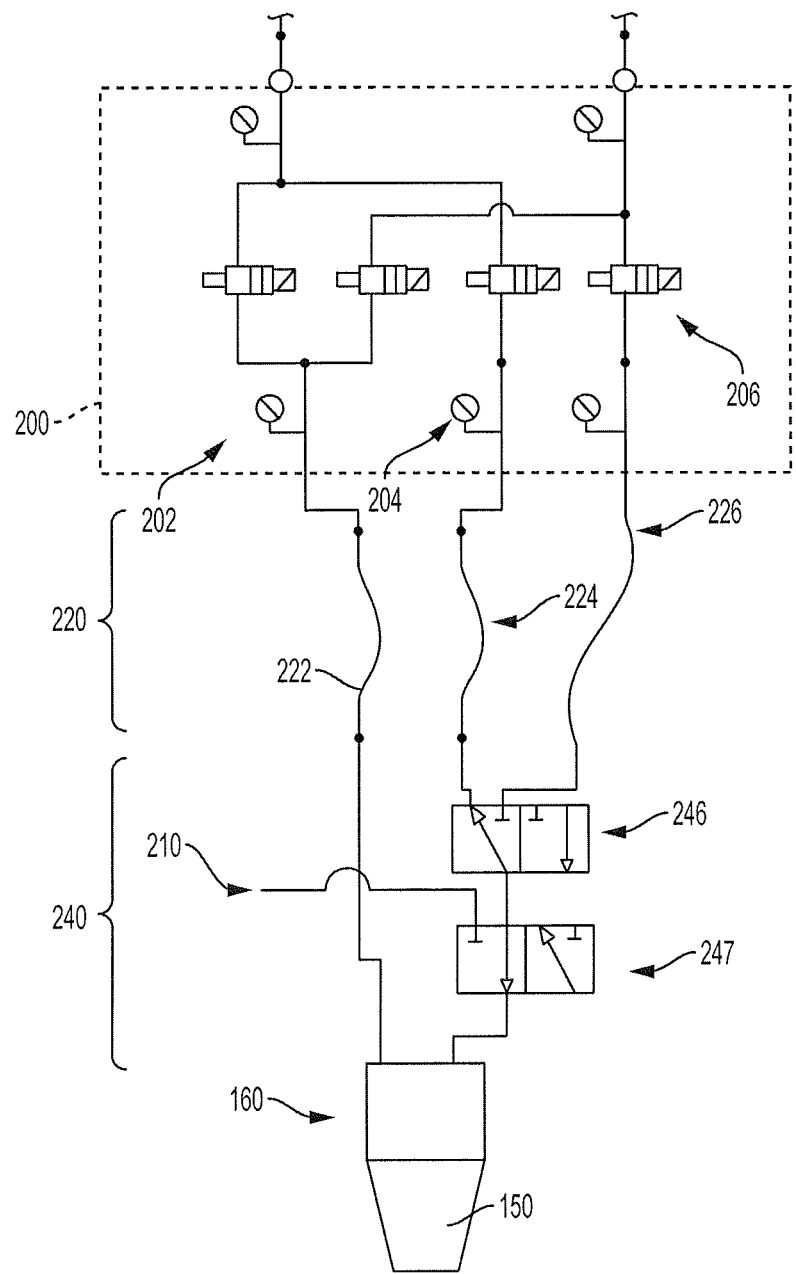
FIG. 2 is a schematic diagram of a plasma arc torch system having a system for back-venting in a plasma arc torch upstream through a valve at or near the torch.

In some embodiments, a plasma cutting system can be configured to have multiple gas flow directing valves at or near the torch. For example, referring to FIG. 2, a plasma cutting system can include a power supply 200 having a metering console that provides a set of gas supplies, which can include a shield gas supply 202, a first processing gas (e.g., plasma gas (e.g., a pre-flow plasma gas)) 204, and a second processing gas (e.g., plasma gas (e.g., a cut flow plasma gas)) 206. The configurations of the different gas supplies can vary based on the desired material processing operation.

Similar to the examples described above with respect to FIG. 1, the plasma cutting system can include a lead line 220 that includes a shield gas passage 222, a first processing gas passage 224, and a second processing gas passage 226.

The valves to control gas can be disposed in or on a torch 150 or within another structural component, such as a torch receptacle 240. In some embodiments, a multiway valve (e.g., a 3-way valve) 246 can be disposed on or near the torch body 160 to selectively deliver the desired processing gas to the torch, as described above. Additionally, another valve 247 can be disposed at or near the torch, such as between the multiway valve 246 and the torch body 160 to permit or block the selected processing gas from passing on to the torch. As illustrated, the valve 247 can also be fluidly connected to a vent 210. During use, the valve 247 can therefore be used during transition periods, start-up, or shut down sequences in order to quickly vent processing gas upstream of the torch. That is, pursuant to one or more of the methods described herein, valve 247 can improve an accelerated shut down sequence by significantly reducing the vent time/gas pressure decay and evacuation of gases in the plasma plenum of torch 150.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A method of operating a plasma cutting system by selecting between a set of plasma gases in a receptacle of a plasma arc torch, the set of plasma gases supplied via a torch lead from a manifold of the plasma cutting system, the plasma arc torch comprising an electrode and a nozzle mounted within a torch tip, the torch receptacle directly coupled to the torch tip such that the torch lead of the plasma cutting system is connectable to the torch receptacle, the torch receptacle having a valve configured to manipulate the set of plasma gases by selectively blocking the flow of each of the gases through a torch gas conduit to the plasma arc torch tip, wherein a distance between the valve in the torch receptacle is at least about 2 meters from the manifold, the method comprising:

supplying a first plasma gas of the set of plasma gases through a first conduit of the torch lead coupled to the torch receptacle, the first plasma gas traveling to the plasma arc torch through the valve;

igniting a plasma arc within the plasma arc torch in the presence of the first plasma gas;

selecting a second plasma gas of the set of plasma gases by activating the valve to: i) block further flow of the first plasma gas downstream to the plasma arc torch, and ii) permit flow of the second plasma gas from a second conduit of the torch lead to the plasma arc torch through the valve; and performing a plasma cutting operation using the second plasma gas.

2. The method of claim 1 further comprising, activating the valve to: i) block further flow of the second plasma gas downstream to the plasma arc torch from the second conduit, and ii) vent remaining second plasma gas upstream through the torch lead and out the manifold to reduce pressure in the plasma arc torch.

3. The method of claim 1 further comprising, initiating a plasma arc shut down sequence.

4. The method of claim 1 further comprising venting the first conduit of the torch lead to atmospheric pressure at the manifold upstream of the plasma arc torch to release the first plasma gas from the torch lead by activating the valve.

5. The method of claim 1 wherein the selecting the second plasma gas transitions a gas supply at the plasma arc torch from the first plasma gas of the first conduit to the second plasma gas of the second conduit in less than about 1 second.

6. The method of claim 1 wherein the torch gas conduit has a volume of less than about 0.3 cubic inches.

7. The method of claim 1 wherein the torch gas conduit has a volume of less than about 0.2 cubic inches.

8. The method of claim 1 further comprising venting an excess of plasma gas blocked by the valve upstream through the torch lead.

9. The method of claim 1 further comprising supplying shield gas to the plasma arc torch through a third conduit.

10. The method of claim 1 wherein the first plasma gas comprises a pre-flow plasma gas and the second plasma gas comprises a cut plasma gas.

11. The method of claim 1 wherein the set of plasma gases is supplied via the torch lead from a manifold of a power supply of the plasma cutting system.

* * * * *